United States Patent [19]

Weiford et al.

[11] Patent Number: 4,730,397
[45] Date of Patent: Mar. 15, 1988

[54] JIG SAW WITH TWO-PIECE SHOE

[75] Inventors: David W. Weiford; Robert I. Somers, both of Raleigh, N.C.

[73] Assignee: Black & Decker, Inc., Newark, Del.

[21] Appl. No.: 764,195

[22] Filed: Aug. 9, 1985

[51] Int. Cl.⁴ ............................................. B23D 49/04
[52] U.S. Cl. ....................................... 30/392; 30/290
[58] Field of Search .................... 30/166 R, 392, 372, 30/373, 374, 375, 376, 379, 290, 516

[56] References Cited

U.S. PATENT DOCUMENTS 3,087,519  4/1963  McCarty et al. ..................... 30/373
3,478,786  11/1969  Hendrickson .......................... 30/376

Primary Examiner—Frederick R. Schmidt
Assistant Examiner—Maurina Rachuba
Attorney, Agent, or Firm—Finnegan, Henderson, Farabow, Garrett & Dunner

[57] ABSTRACT

A hand-held, fan-cooled motor drive jig saw with a two-piece, tiltable shoe assembly having a reversible, phenolic resin base portion with a wide recess for scrolling and a narrow recess for straight cuts. The base is connected to the shoe cover independent of the attachment of the cover to the saw housing to maintain a pre-selected tilt angle. Coolant air exhausted from the saw housing is channeled through flow passages in the shoe assembly to outlet ports in the shoe assembly to provide debris-clearing air streams oriented parallel to the workpiece surface and perpendicular to the cutting direction. The housing exhaust port is flow-connected to the shoe assembly through complementary sliding surfaces at the point of attachment.

23 Claims, 12 Drawing Figures

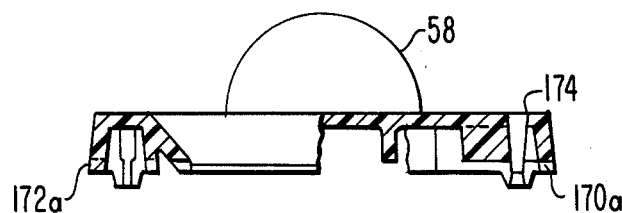
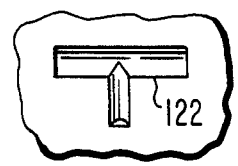
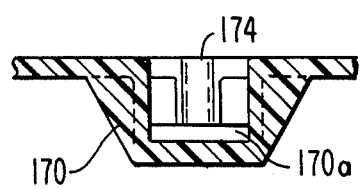
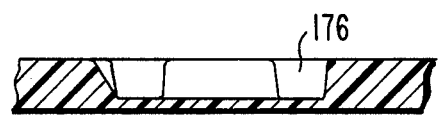
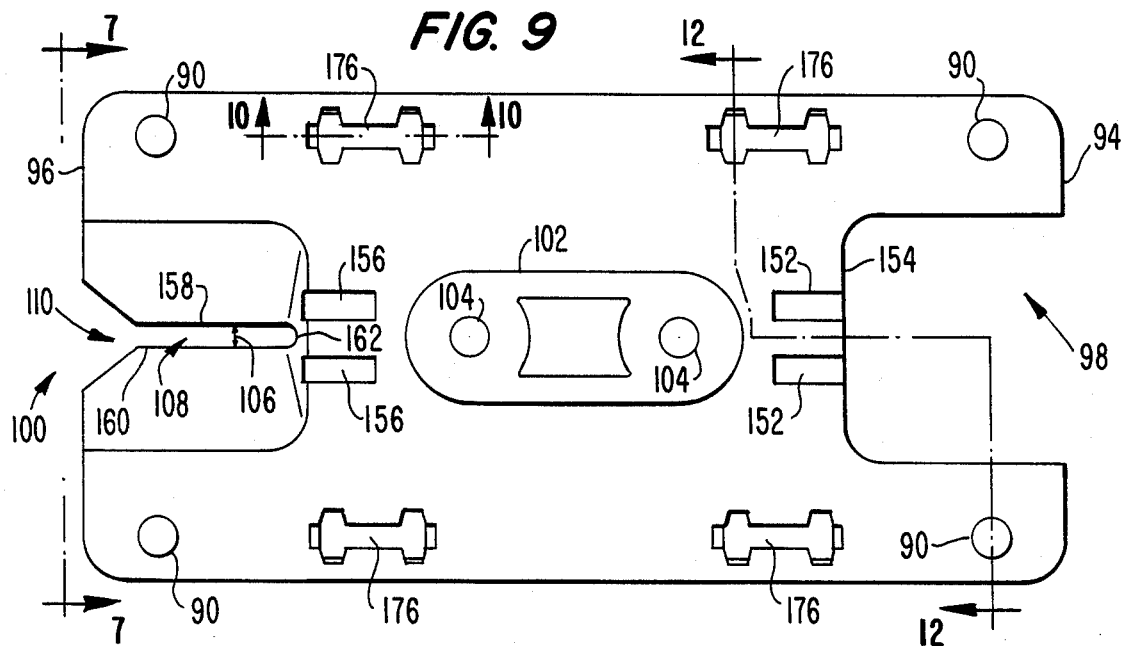
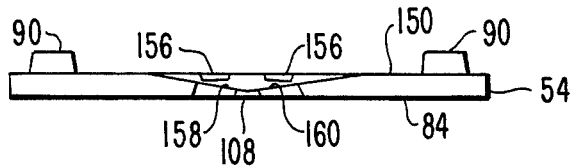
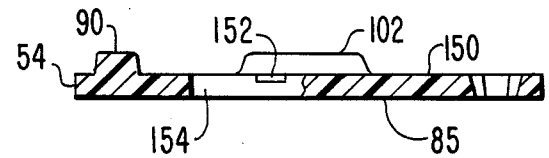

JIG SAW WITH TWO-PIECE SHOE

BACKGROUND OF THE INVENTION

1. Field of the Invention

The present invention relates to hand-held power jig saws having an attached shoe for engaging the workpiece to be cut.

2. Description of the Prior Art

Hand-held power jig saws of the type having one-piece, all-metal shoes are known in the art. In some of these conventional jig saws, the shoe can be selectively tilted relative to the saw housing to provide angled cuts. Typically, the shoes are made of steel sheet metal which is costly to form in the smooth, burr-free condition that is required to prevent scratching and marring of the workpiece surface. Moreover, the all-metal construction adds significant weight to the overall saw assembly making extended operation tiring for the operator.

It is also known to make one-piece, all metal shoes with a narrow blade-receiving recess at one end and a relatively wide recess at the other. This conventional shoe is "reversible" in that it can be rotated 180 degrees to position the narrow recess to cooperate with the saw blade to reduce splintering of the workpiece, when making straight cuts. The wider recess is used whenever a "scrolling" cutting operation is required or cutting at angle is desired.

However, rotation of the two-recess one-piece shoe usually involves loosening of the shoe-housing mounting connection and can disrupt the tilt angle setting of the shoe. In such cases where the shoe also is "tiltable" relative to the housing, the angle must be reset after each change to a different blade-receiving recess.

Typical hand-held powered jig saws generally use a fan-cooled electric motor contained within the saw housing to provide reciprocation of the saw blade. In some prior art jig saws the exhaust port for the cooling air is positioned in the forward portion of the housing and directs the exhaust air to clear debris from the cutting location. However, with this arrangement the debris is blown directly forward of the cutting location and has a tendency to accumulate in the cutting path and obscure the cutting line. Also, different tilt angle positions may diminish the effectiveness of debris-clearing air streams emanating directly from the housing.

Consequently, it is an object of the present invention to provide a jig saw and shoe attachment that overcomes one or more of the afore-mentioned deficiencies in prior art devices.

SUMMARY OF THE INVENTION

In accordance with the invention, as embodied and broadly described herein, the apparatus for use with a jig saw of the type having a reciprocating blade driven by an air-cooled motor and a housing with an exhaust port for the cooling air, comprises a shoe connectable to the saw housing for engaging the workpiece, the shoe having a shoe portion proximate the location of cutting contact between the saw blade and the workpiece. The apparatus further comprises cooling air guide means associated with the shoe for receiving cooling air from the exhaust port, channeling the received air to the shoe proximate portion, and directing the channeled air toward the cutting location, whereby debris resulting from the sawing operation is blown clear of the cutting location.

Preferably, the air guide means includes a shoe surface configured to matingly contact the portion of the housing surrounding the exhaust port, and an inlet port formed in the shoe surface to receive the exhausted cooling air. When the apparatus further includes means associated with the shoe for selectively tilting the shoe relative to the saw axis for making angled cuts, the shoe mating surface is in continuous slidable contact with a complementary housing surface surrounding the exhaust port for maintaining flow interconnection between the exhaust port and the inlet port.

It is also preferred that the proximate shoe portion partially surrounds the cutting location and that the cooling air guide means includes a plurality of outlet ports formed in the proximate shoe portion and having respective axes intersecting the cutting location preferably at right angles to the cutting direction.

It is also preferred that the shoe be a two-piece assembly including a generally planar base, preferably made of plastic, having a smooth, low friction workpiece-engaging surface, and a cover detachably connected to the base and having a raised portion defining in conjunction with the base an air chamber. The cover has inlet means connecting the air chamber to the exhaust port for receiving exhaust air from the fan-cooled motor, and outlet means connected to the chamber for directing the received exhaust air toward the location of cutting contact between the saw blade and the workpiece.

It is still further preferred that where said shoe is intended to be titled relative to the saw housing and includes a cover and an associated base, the cover is selectively connectable to the housing independently of the base. The base can then include at least two saw blade receiving recesses formed in the periphery of the base, and the base can be selectively connected to the cover for orienting a desired blade receiving recess in position to receive the saw blade without changing the selected angle of tilt.

The accompanying drawing which is incorporated in and constitutes a part of the specification, illustrates one embodiment of the invention and, together with the description, serves to explain the principles of the invention.

BRIEF DESCRIPTION OF THE DRAWING

FIG. 6 is a cross section taken at 6—6 in FIG. 4;

FIG. 7 is an enlarged detail of one of the tilt angle indicia depicted in FIG. 3;

FIG. 8 is a cross section taken at 8—8 in FIG. 4;

FIG. 9 is a top plan view of the base portion of the shoe shown in FIG. 1;

FIG. 10 is a cross section taken at 10—10 in FIG. 9;

FIG. 11 is a view of the base shoe portion taken at 11—11 in FIG. 9; and

FIG. 12 is a cross section taken at 12—12 in FIG. 9.

DESCRIPTION OF THE PREFERRED EMBODIMENT

Reference will now be made in detail to the present preferred embodiment of the invention, an example of which is illustrated in the accompanying drawing.

Figure 1:
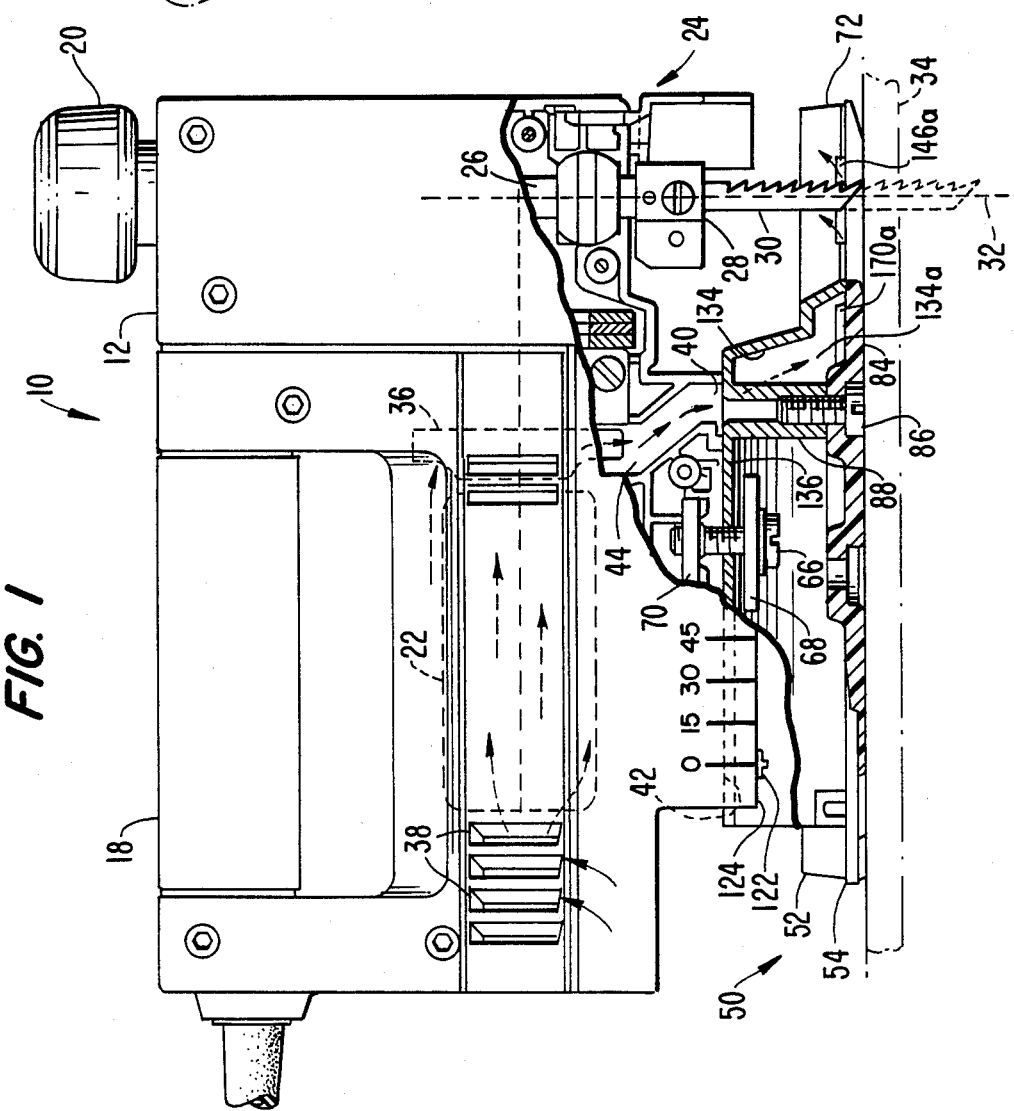
FIG. 1 is a side view, partially in section, of apparatus comprising a jig saw and two-piece shoe attachment made in accordance with the present invention.

With initial reference to FIG. 1, there is shown a jig saw made in accordance with the present invention and designated generally by the numeral 10. Jig saw 10 includes housing 12 which may be of a conventional "clam-shell" construction, that is, having opposing complementary housing portions 14, 16 (see FIG. 2) forming a hollow interior. Housing 12 includes appropriate hand-engaging surfaces, such as handle 18. An additional hand-engaging member such as knob 20 can be secured to housing 12 to provide for two-hand operation.

As is conventional, jig saw 10 also includes electric motor 22 mounted within housing 12 the shaft of which is interconnected by a suitable gear and eccentric drive (both not shown) to a saw assembly designated generally as 24. Assembly 24 includes shaft 26 with external collar 28 for mounting saw blade 30. Shaft 26 is mounted within housing 12 for reciprocating movement along axis 32 which also constitutes the saw axis. Upon activation of motor 22 by a switch (not shown) which can be associated with handle 18, the eccentric drive (not shown) causes shaft 26 and blade 30 to reciprocate along axis 32 to perform a cutting action on a workpiece, such as workpiece 34 depicted schematically in FIG. 1.

To provide cooling of electric motor 22 during operation, fan impeller 36 is mounted to be driven by motor 22 causing air to flow past the surfaces of motor 22. In the disclosed embodiment, fan impeller 36 is mounted directly on the shaft (not shown) of motor 22 between motor 22 and saw assembly 24 and "pulls" the air past motor 22. Other fan arrangements are, of course, possible such as the use of fan impellers which "push" the air past the motor surface which would be located upstream of the motor in such an alternate configuration. In either construction, the interior of housing 12 surrounding motor 22 is suitably configured to allow air flow past motor 22. Apertures 38 are formed in housing 12 upstream of motor 22 to provide access to the housing interior for the cooling air.

In accordance with the present invention, the jig saw housing also is provided with an exhaust port for the air used to cool the motor. As embodied herein, and with continued reference to FIG. 1, jig saw 10 includes exhaust port 40 formed in lower surface 42 of housing 12. Channel 44 formed in the interior of housing 12 connects exhaust port 40 to the portion of housing interior surrounding the periphery of impeller 36. The resultant flow path for at least a portion of the cooling air through housing 12 during operation of motor 22 is through apertures 38, past surfaces of motor 22, through impeller 36, and finally through channel 44 and out exhaust port 40, the flow path being depicted by appropriate arrows in FIG. 1.

Figure 3:
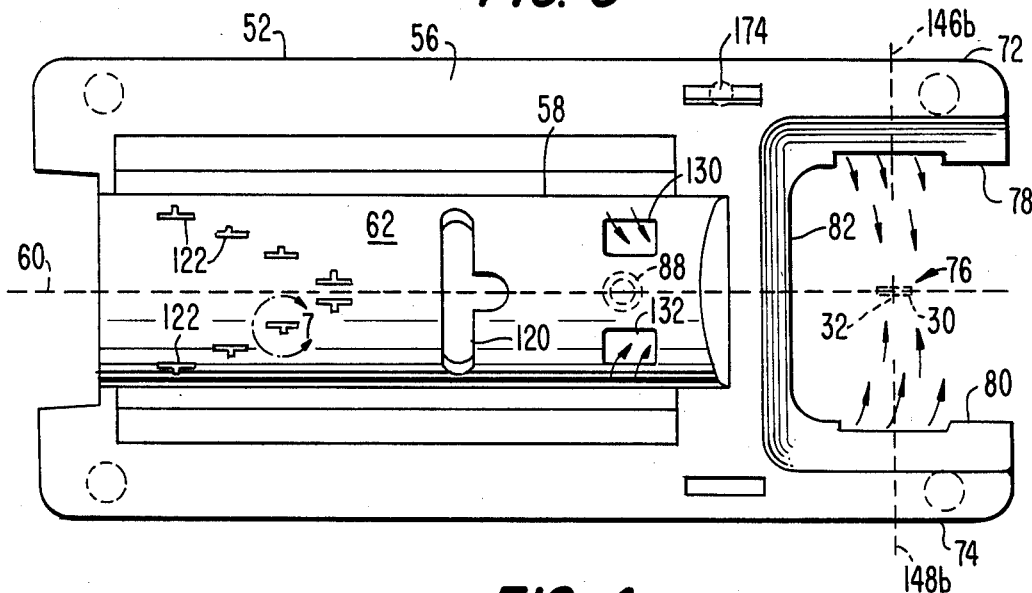
FIG. 3 is a top-plan view of the cover portion of the shoe shown in FIG. 1.
Figure 4:
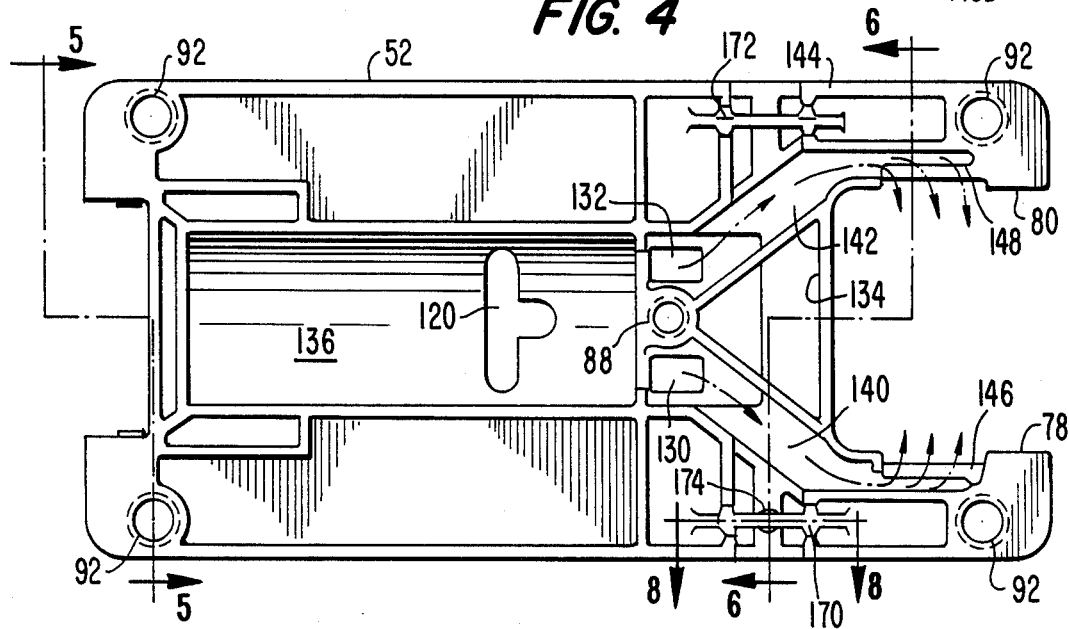
FIG. 4 is a bottom plan view of the cover shown in FIG. 3.
Figure 5:
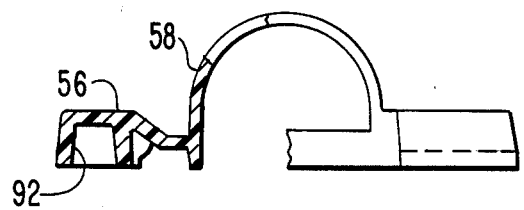
FIG. 5 is a cross section taken at 5—5 in FIG. 4.

In accordance with the present invention, the jig saw further includes a shoe connected to the housing for engaging the workpiece and having a shoe portion located proximate the location of cutting contact between the saw blade and the workpiece. As embodied herein, and with continued reference to FIG. 1, jig saw 10 includes shoe assembly 50 which preferably is of a two-piece construction. As shown in the drawing, shoe assembly 50 includes cover 52 for attachment to housing 12 and base 54 for engaging workpiece 34. As best seen in FIGS. 3 and 4, cover 52 has a generally planar, rectangular peripheral portion 56 with a central, raised portion 58. Raised portion 58 has a semi-cylindrical shape with the cylindrical axis 60 aligned in the intended cutting direction to intersect cutting axis 32. Outer cylindrical surface 62 of raised portion 58 abuttingly contacts housing surface 42 (see FIG. 1) which has a complementary cylindrical shape for reasons that will become apparent from the succeeding discussion. As best seen in FIG. 1, a mounting assembly including bolt 66, washer 68 and mounting plate 70 are used to secure cover 52 to housing 12. Other mounting assemblies, of course, are possible and are considered within the scope of the present invention.

As best seen in FIG. 3, cover 52 includes a pair of arms 72, 74 extending in the forward direction with respect to the intended direction of cutting and positioned on either side of the cutting location designated 76 in FIG. 3. Arms 72, 74 have respective cutting location-facing edges 78, 80 which, together with cover portion edge 82 define a "u" shaped recess partially surrounding cutting location 76.

Base 54 of shoe assembly 50 also has a generally planar, rectangular shape and is sized to complement the periphery of planar portion 56 of cover 52. Base 54 includes workpiece-engaging surface 84 and an opposing surface 150 for mating with surface 144 of cover 52. Workpiece-engaging surface 84 should be relatively smooth, exhibit low friction when engaging the workpiece, and have rounded edges to prevent marring. Preferably, base 54 is fabricated from a nonmarring, plastic material such as a phenolic resin to provide a lightweight, low cost, but durable base component for shoe assembly 50. Base 54 is attached to cover 52 via bolt 86 engaging threaded aperture 88 formed in cover 52. Studs 90 are provided at the corners of base 54 and are receivable in corresponding holes 92 in cover 52 to provide registration between the two parts of shoe assembly 50 and prevent relative rotational movement of the pieces about the axis of connecting bolt 86.

Preferably, saw blade receiving recesses are formed in opposing ends of the base portion of the shoe assembly, with one of the recesses having a reduced width portion for suppressing splitting of the underlying workpiece. As embodied herein, and with reference to FIG. 9, opposing ends 94, 96 of base 54 have respective recesses 98, 100. Base 54 also has a central boss 102 with a pair of holes 104 each sized for receiving connecting bolt 86 and each alignable with threaded aperture 88 when a respective one of base portion ends 94, 96 is oriented in the forward, cutting direction. Base 54 can thus be selectively mounted with either recess 98 or 100 aligned with the recess formed by cover arms 72, 74 without disturbing the connection between cover 52 and housing 12. Recess 98 is sized to have essentially the same transverse width as the recess defined by cover arms 72, 74 but recess 100 has a substantially smaller width (designated by the numeral 106) in portion 108 proximate the blade location. The downward pressure on the workpiece by the portions of base surface 84 immediately adjacent recess portion 108 reduces the tendency of the workpiece to splinter. Recess 100 also includes a converging width portion 110 to guide base 54 past saw blade 30 during the positioning of recess 100 for receiving the blade.

Figure 2:
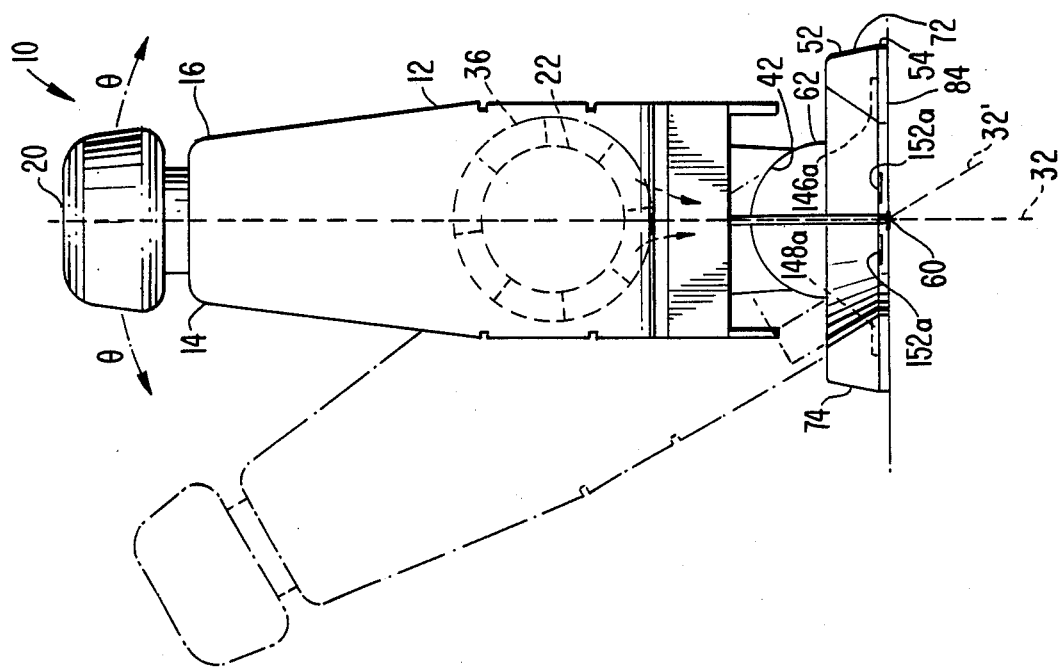
FIG. 2 is a front view of the apparatus shown in FIG. 1.

It is also preferred that the shoe assembly and the jig saw housing be tiltable relative to one another to provide for engagement of the workpiece by the saw blade at different angles. As embodied herein, and with reference first to FIG. 9, mounting hole 120 through which connecting bolt 66 passes is elongated in the circumferential direction to provide bolt alignment with mounting plate 70 over a range of tilt angles $\theta$ on either side of the vertical position, deemed "0°" for the purposes of the present discussion. As is depicted in FIG. 2, the mating, slideable cylindrical surfaces 42 and 62 of housing 12 and shoe cover 52, respectively, allow rotation of housing 12 about cylindrical axis 60 to change the orientation of the blade axis relative to workpiece-engaging surface 84 of base 54, the changed axis being denoted by the numeral 32'. The curvature and positioning of raised portion 58 should be chosen to cause cylindrical axis 60 to lie as close as possible to the plane of workpiece-engaging surface 84 to maintain the point of engagement between the blade and the workpiece at the center of the defined recess.

As mentioned previously, because cover 52 is attached to housing 12 independently of base 54, the blade-receiving recess in base 54 can be changed without disturbing the angular setting between housing 12 and shoe assembly 50. Additional means are provided in the disclosed embodiment for accurately setting the specific angle between the housing and the shoe assembly. As best seen in FIGS. 3 and 7, "t"-shaped recesses 122 are formed in cylindrical surface 62 of cover 52. The individual recesses 122 correspond to particular predetermined angular settings such as "0°", "15°", etc. and cooperate with edge 124 of housing surface 42 by providing visual indicia at each of the predetermined angular positions. The individual recesses 122 allow, upon loosening of connecting bolt 66, housing edge 124 to slide past the individual indicia without interference, for the purpose of changing the angular setting.

Still further in accordance with the present invention, cooling air guide means associated with the shoe assembly are provided for receiving cooling air from the housing exhaust port, channeling the received air to the shoe portion proximate the cutting location, and directing the channeled air toward the cutting location. As embodied herein, and with reference first to FIG. 3, the air guide means includes a pair of inlet ports 130, 132 formed in cylindrical surface 62 of raised portion 58. Either one or both inlet ports 130, 132 are alignable with exhaust port 40 in mating cylindrical housing surface 42 over the full range of tilt angles between housing 12 and shoe assembly 50. Exhaust port 40 also is elongated in a circumferential direction to provide engagement with the spaced inlet ports 130, 132. Inlet ports 130, 132 also communicate with a section 134 of raised cover portion 58 which is purposely made hollow for reasons that will be explained hereinafter. Hollow section 134 in cooperation with surface 150 of base 54 thus forms chamber 134a for collecting the air received through inlet ports 130, 132. As shown in the Figures, rear section 136 of raised cover portion 58 also is made hollow to provide storage space for saw blades, tools, etc.

As further embodied herein, and as best seen in FIG. 4, the cooling air guide means also includes slots 146, 148 formed in surface 144 of cover 52 at arm edges 78, 80, respectively, and grooves 140, 142 formed in surface 144 and connecting chamber 134a with slots 146, 148. In cooperation with mating surface 150 of base portion 54, slots 146, 148 comprise outlet ports 146a, 148a for the cooling air received from chamber 134a. Mating surface 150 in cooperation with grooves 140, 142, of course, provide enclosed channels for carrying the coolant air between chamber 134a and the outlet ports 146a, 148a.

As depicted schematically in the drawings, the air flow through outlet ports 146a, 148a is predominantly parallel to the workpiece surface but perpendicular to the cutting direction having flow axes designated 146b and 148b, respectively. This air flow orientation acts to flush debris from the cutting location including the area immediately forward of the blade to provide a more accurate visual alignment of the blade with the cutting mark. Importantly, this air flow orientation is independent of the tilt angle $\theta$. Cover 52 preferably is fabricated from a light-weight die-castable material such as aluminum. If die casting is used, appropriate internal ribbing can be used to define the hollow section 134, grooves 140, 142 and slots 146, 148, thereby substantially reducing, or eliminating entirely, the need for costly machining.

It is also preferred that additional outlet ports be provided at the base of the blade-receiving recess to prevent accumulation of debris. As embodied herein and with reference to FIG. 9, slots 152 are formed in mating surface 150 of base 54 extending from bottom edge 154 of recess 98 inward a distance sufficient to provide flow communication with chamber 134a. Slots 152 in cooperation with the overlying portion of cover surface 144 comprise additional outlet ports 152a as the exiting air flow would be in a direction to clear debris from the rear edge of recess 98. Comparable slots 156 are formed adjacent recess 100. Base edges 158, 160 forming the sides of recess 100 and base edge 162 forming the bottom of recess 100, are tapered to provide airflow to slot portion 108 for debris removal and improved visibility.

In the embodiment depicted in the drawing, cover 52 of shoe assembly 50 includes bosses 170, 172 with associated slots 170a, 172a (see FIGS. 3 and 4) for the insertion of a "T" bar-type cutting guide (not shown). Boss 170 includes threaded hole 174 for a hold-down screw (also not shown). Base 54 includes indents 176 which receive the lower parts of bosses 170, 172 which lower parts take up the reaction force from the hold-down screw and prevent separation of cover 52 from base 54. Although some coolant air leaks from chamber 134a through slots 170a, 172a when no cutting guide bar is used, the leakage does not affect the performance of the disclosed air guide means.

It will be apparent to those skilled in the art that various modifications and variations can be made in the jig saw and jig saw shoe of the present invention without departing from the scope or the spirit of the invention. Thus, it is intended that the present invention cover these modifications and variations provided they come within the scope of the appended claims and their equivalents.

What is claimed is:

1. Apparatus for use with a jig saw of the type having a reciprocating blade driven by a air-cooled motor and a housing with an exhaust port for the cooling air, the apparatus comprising:

a shoe connectable to the saw housing for engaging the workpiece, said shoe having a shoe portion proximate the location of cutting contact between the saw blade and the workpiece; and cooling air guide means associated with said shoe for receiving cooling air from the exhaust port, channeling said received air to said shoe proximate portion, and directing said channeled air toward said cutting location to be incident upon said cutting location at an angle substantially different from 0° with respect to the axis of reciprocation of the blade, whereby debris resulting from the sawing operation is blown clear of said cutting location.

2. The apparatus as in claim 1 wherein said air guide means includes a shoe surface configured to matingly contact the portion of the saw housing surrounding the exhaust port and an inlet port formed in said shoe surface to receive the exhausted cooling air.

3. Apparatus for use with a jig saw of the type having a reciprocating blade driven by an air-cooled motor and a housing with an exhaust port for the cooling air, the apparatus comprising:
- a shoe connectable to the saw housing for engaging the workpiece, said shoe having a shoe portion proximate the location of cutting contact between the saw blade and the workpiece; and
- cooling air guide means associated with said shoe for receiving cooling air from the exhaust port, channeling said received air to said shoe proximate portion, and directing said channeled air toward aid cutting location, whereby debris resulting from the sawing operation is blown clear of said cutting location,
- wherein said air guide means inclues a shoe surface configured to matingly contact the portion of the saw housing surrounding the exhaust port and an inlet port formed in said shoe surface to receive the exhausted cooling air,
- said apparatus further including means associated with said shoe for selectively tilting said shoe relative to the saw axis for making angled cuts, and wherein said mating surface is configured for continuous sliding contact with the saw housing for maintaining flow interconnection between the exhaust port and said inlet port.

4. Apparatus for use with a jig saw of the type having a reciprocating blade driven by an air-cooled motor and a housing with an exhaust port for the cooling air, the apparatus comprising:
- a shoe connectable to the saw housing for engaging the workpiece, said shoe having a shoe portion proximate the location of cutting contact between the saw blade and the workpiece; and
- cooling air guide means associated with said shoe for receiving cooling air from the exhaust port, channeling said received air to said shoe proximate portion, and directing said channeled air toward said cutting location, whereby debris resulting from the sawing operation is blown clear of said cutting location,
- wherein said cooling air guide means includes said shoe having a hollow interior forming an exhaust air receiving chamber, inlet means connecting the exhaust port to said chamber, and outlet means connecting said chamber to said shoe portion proximate the cutting location.

5. Apparatus for use with a jig saw of the type having a reciprocating blade driven by an air-cooled motor and a housing with an exhaust port for the cooling air, the apparatus comprising:
- a shoe connectable to the saw housing for engaging the workpiece, said shoe having a shoe portion proximate the location of cutting contact between the saw blade and the workpiece; and
- cooling air guide means associated with said shoe for receiving cooling air from the exhaust port, channeling said received air to said shoe proximate portion, and directing said channeled air toward said cutting location, whereby debris resulting from the sawing operation is blown clear of said cutting location,
- wherein said proximate shoe portion partially surrounds the cutting location and wherein said cooling air guide means includes a plurality of outlet ports fromed in said proximate shoe portion and having respective axes intersecting the cutting location.

6. The apparatus as in claim 5 wherein said shoe has a generally planar workpiece-engaging surface, and wherein said proximate shoe portion includes a pair of opposed outlet ports the respective axes of which are essentially parallel to said workpiece-engaging surface and perpendicular to the direction of cutting.

7. Shoe apparatus for a jig saw of the type having a reciprocating blade drive by an air-cooled motor, and a housing with an exhaust port for the cooling air, the apparatus comprising:
- a generally planar base having a smooth, low friction workpiece-engaging surface; and
- a cover detachably connected to said base opposite said surface and having a raised portion defining in conjunction with said base an air chamber, said cover further including
  (i) inlet means for connecting said air chamber to the saw exhaust port for receiving exhaust air from the air-cooled motor, and
  (ii) outlet means connected to said chamber for directing the received exhausted cooling air toward the location of cutting contact between the saw blade and the workpiece to clear cutting debris.

8. The shoe apparatus as in claim 7 wherein said base is formed of a nonmarring, plastic material.

9. The shoe apparatus as in claim 7 wherein said base includes at least two open-ended recesses formed in the base periphery, each of said recesses defining a saw blade receiving space, and wherein at least one of said recesses has a reduced width-portion for minimizing splintering of the underlying workpiece.

10. The shoe apparatus as in claim 9 further including means for indexing said base relative to said cover for selectively moving a desired one of said recesses into a saw blade-receiving position.

11. The shoe apparatus as in claim 7 wherein said cover raised portion includes a surface for mating with a complementary surface on the jig saw housing, and wherein said inlet means includes an inlet port formed in said surface and alignable with the exhaust port, the exhaust port being positioned in the complementary surface of the saw housing.

12. The shoe apparatus as in claim 7 further including means for connecting said cover to the saw housing for orienting said workpiece-engaging surface at a selected angle of tilt relative to the saw blade axis.

13. The shoe apparatus as in claim 11 wherein said cover is attachable to the saw housing through said mating surface, and wherein said shoe cover mating surface is slidable relative to the complementary housing surface for selectively tilting said workpiece-engaging surface of said shoe base relative to the axis of the saw blade.

14. The shoe apparatus as in claim 13 wherein said raised portion has a semi-cylindrical shape with the cylindrical axis extending in the intended cutting direction of the saw.

15. The shoe apparatus as in claim 7 wherein said cover includes a pair of arms defining, and partially enclosing, a saw blade receiving recess, and wherein said outlet means includes a pair of channels formed in the surface of said cover facing said base, each of said channels extending from the vicinity of said raised portion to the saw blade facing edge of a respective one of said arms, said channels in conjunction with said base forming respective passageways and opposed outlet ports for the exhausted cooling air.

16. The apparatus as in claim 15 including at least one additional channel extending from the vicinity of said raised portion to the cover edge defining the base of the recess and forming, in conjunction with said base, another passage-way and another outlet port for the exhausted cooling air, said another outlet port for preventing accumulation of cutting debris in said recess during operation of the saw.

17. A jig saw comprising:
a housing;
a blade assembly attached to said housing the blade assembly including a blade extending outside the housing for engaging a workpiece;
an electric motor connected to said blade assembly for reciprocating said blade member along an axis;
means for supplying air for cooling said motor, said cooling air supply means including an exhaust port in said housing;
a shoe connected to said housing for engaging the workpiece, said shoe having a shoe portion proximate the location of cutting contact between the saw blade and the workpiece; and
cooling air guide means associated with said shoe for receiving cooling air from said housing exhaust port, channeling said received air to said shoe portion, and directing said channeled air toward said cutting location, whereby debris resulting from the sawing operation is blown clear of said cutting location.

18. The jig saw as in claim 17 wherein said cooling air supply means also includes a fan element connected to and rotatable with, said electric motor.

19. The jig saw as in claim 17 wherein said shoe includes a cover and an associated base with a workpiece-engaging surface, said cover being selectively connectable to said saw housing to vary the tilt angle between said base surface and said saw blade axis, said base further including a plurality of saw blade receiving recesses formed along the periphery of the base, said base being selectively connectable to said cover for orienting a desired blade receiving recess in position to receive said saw blade without changing the selected angle of tilt.

20. The jig saw as in claim 17 wherein said exhaust port is positioned in a portion of said housing having a surface facing said workpiece; wherein said shoe includes a shoe surface abutting said housing surface to overlap said exhaust port; and wherein said cooling air guide means includes an inlet port formed in said shoe surface to be aligned with said exhaust port when said surfaces are overlapped.

21. Apparatus for use with a jig saw of the type having a reciprocating blade extending from a housing, the apparatus comprising:
a shoe assembly for engaging the workpiece to be cut, said shoe assembly further including
a cover attachable to said housing,
a base having a workpiece-engaging surface and a pair of opposed blade-receiving recesses, the width of one of said recesses being substantially smaller than the width of the other to suppress the formation of splinters, and
means for connecting said base to said cover to selectively position one or the other of said recesses for receiving the blade.

22. The apparatus as in claim 21 wherein said cover is metal and said base is plastic.

23. The apparatus as in claim 21 further including means for attaching said cover to the jig saw housing, said attaching means providing for attachment over a range of angles between the axis of reciprocation of the blade and said workpiece-engaging surface of said connected base, wherein said attaching means is independent of said base, and whereby said base can undergo a recess-changing operation without disturbing the angular setting between the blade axis and said workpiece-engaging surface of said connected base.

* * * * *